(12) United States Patent
Kirby

(10) Patent No.: US 6,168,493 B1
(45) Date of Patent: Jan. 2, 2001

(54) GAME CALL RELIABLY ADJUSTABLE FOR DIFFERENT SOUNDS

(76) Inventor: Richard C. Kirby, 6426 W. Quaker Rd., Orchard Park, NY (US) 14127

(*) Notice: Under 35 U.S.C. 154(b), the term of this patent shall be extended for 0 days.

(21) Appl. No.: 09/358,029

(22) Filed: Jul. 21, 1999

Related U.S. Application Data (60) Provisional application No. 60/097,818, filed on Aug. 25, 1998.

(51) Int. Cl.[7] ..................................................... A63H 5/00
(52) U.S. Cl. ........................................... 446/418; 446/397
(58) Field of Search .................................. 446/397, 418, 446/421, 422

(56) References Cited

U.S. PATENT DOCUMENTS

| | | |
|---|---|---|
| D. 347,399 | 5/1994 | White, Jr. . |
| D. 360,160 | 7/1995 | Morningstar . |
| D. 393,810 | 4/1998 | Richardson . |
| 574,534 | 1/1897 | Gibson . |
| 3,793,767 | * 2/1974 | Pulley . |
| 4,343,108 | 8/1982 | Lee . |
| 4,422,262 | 12/1983 | Moss . |
| 4,664,641 | 5/1987 | Hearn et al. . |
| 4,846,753 | 7/1989 | Langston . |
| 4,932,920 | 6/1990 | Hearn . |
| 4,941,858 | 7/1990 | Adams . |
| 5,380,235 | 1/1995 | Forbes et al. . |
| 5,484,319 | 1/1996 | Battey . |
| 5,830,036 | 11/1998 | Richardson . |

* cited by examiner

*Primary Examiner*—Jacob K. Ackun
*Assistant Examiner*—Jeffrey D. Carlson
(74) *Attorney, Agent, or Firm*—James C. Simmons

(57) ABSTRACT

A box type game call wherein a striking member is attached at one end by a screw to one end wall of a box. The striking member has one or more slots for receiving the screw shank for movement of the screw shank along the slot or slots to different positions for varying the orientation of the striking member relative to the box for adjusting the sound quality. In one embodiment, a pair of slots cross each other. The striking member has a plurality of recesses along a slot for receiving the screw head whereby the striking member may be adjusted reliably to different positions by selecting the recess in which the screw head is received. In accordance with an alternative embodiment, a disc is fastened to the box so that it is rotatable, and the screw is eccentrically mounted to the disc so that striking member orientation is adjustable by rotating the disc to a different positiion.

20 Claims, 5 Drawing Sheets

GAME CALL RELIABLY ADJUSTABLE FOR DIFFERENT SOUNDS

Priority is hereby claimed of U.S. provisional patent application Ser. No. 60/097,818, filed Aug. 25, 1998, which application is hereby incorporated herein by reference.

The present invention is generally related to turkey calls but may be applied to other game calls. More particularly, the present invention is related to slidable chambered calls such as those shown in U.S. Pat. Nos. D574,534; 5,830,036; and 4,664,641, which are incorporated herein by reference, and Des. 393,810. Other examples of box type calls are disclosed in U.S. Pat. Nos. 4,343,108; Des. 347,399; 4,422,262; Des. 360,160; 5,484,319; 5,380,235; 4,941,858; 4,932,920; 4,846,753; Des. 574,534; and 3,793,767. Such a call comprises a hand-held wooden box in the form of a trough defining a pair of thin upper edges which are engaged by a paddle or striker member to make the desired sound. The paddle is held to the box at the forward end by a screw in a manner which allows the intermediate portion thereof to be rubbed against the box edges to make the sound.

The turkey call disclosed by the aforesaid '810 design patent and the '036 patent is disclosed to have a longitudinally extending slot in the paddle for receiving the screw. The screw shank receives a spring between the paddle and the box surface engaged by the screw, and a washer is received between the spring and paddle. The slot allows the paddle position to be adjusted in the longitudinal direction of the paddle to vary its position relative to each of the box edges to thereby vary the sound quality, which is considered important to make it appeal to the wild turkey that there is a number of other turkeys around.

The provision of the slot in the aforesaid '810 design patent and the '036 patent does not result in reliable positioning of the paddle since the paddle may slide along the slot and therefore does not allow the same sound to be easily duplicated. As a result, the wild turkey may think something is amiss and thus not be fooled into meeting its doom.

As the paddle in the aforesaid '810 design patent and the '036 patent is moved forwardly, it comes into contact with an edge at a point closer to the forward end of the call whereby a higher pitch sound is produced to duplicate the sound of a younger turkey. The high and low pitch sounds made when the paddle is centered between the edges are generally what are called "clear" sounds. However, the call of the aforesaid '810 design patent and the '036 patent is not able to easily duplicate the more "raspy" sounds made by older turkeys.

The box type turkey call of the aforesaid '641 patent has an eccentrically mounted actuator or paddle wherein the actuator is laterally moveable and is mounted (by means of a screw received in a laterally elongated aperture in the paddle) on a rotatable mounting or bushing with the attachment being eccentric to the mount, thus enabling the game call to produce a variety of different calls. The mount is a cylindrical member which is received in a bore which extends through the vertical forward end wall of the box, and the bottom surface of the member is slotted to accept a tool to affect rotation of the mount. A threaded bolt is provided for movement into locking engagement with the bushing to prevent movement of the bushing relative to the box.

The call of the '641 patent requires a person to loosen the screw, use a wrench to rotate the bushing, then tighten the screw at the new bushing position in order to set the call to a different position. This is especially inconvenient for a hunter in the field. Furthermore, the '641 call allows a limited range of positions, since the attachment must move in a very small circle because the bore must be small enough in diameter so as not to be so close to an edge of the box that the structural integrity of the box forward wall is compromised. In addition, the hole for the screw requires an additional production step.

It is accordingly an object of the present invention to reliably position the paddle in several positions relative to the call box to thereby make several reliably reproducible sounds.

It is a further object of the present invention to position the paddle so as to make raspy as well as clear sounds in different pitches.

It is yet another object of the present invention to provide a box type game call wherein the paddle attachment can be easily adjusted to any position on a circle.

In order to provide such a reliable positioning of the paddle, in accordance with the present invention, a call is provided wherein the paddle is attached to the call box by a screw with the screw shank receiving a spring between the paddle and the call box, and the screw shank receivable in at least one slot in the paddle, the paddle having a plurality of recesses along the slot (or a plurality of slots each having at least one recess) for receiving the screw head whereby the paddle may be adjusted reliably to different positions by selecting the recess in which the screw head is received. In order to produce a variety of sounds including raspy as well as clear sounds, the paddle preferably has a longitudinally extending slot and a slot extending cross-wise thereto. A recess is preferably provided at each end of each slot as well as at the point where the slots cross.

In order to provide such paddle attachment which can be easily adjusted to any position on a circle, in accordance with the present invention, a disc is fastened to the box so that it is rotatable, and the screw is eccentrically mounted to the disc.

The above and other objects, features, and advantages of the present invention will be apparent to those of ordinary skill in the art to which this invention pertains in the following detailed description of a preferred embodiment thereof when read in conjunction with the accompanying drawings wherein the same reference numerals depict the same or similar parts throughout the several views.

DETAILED DESCRIPTION OF THE PREFERRED EMBODIMENT

Referring to FIGS. 1 to 10 of the drawings, there is shown generally at 20 a turkey call composed of wood or other suitable material and which includes a box 22 and a paddle or striker plate 24.

Figure 2:
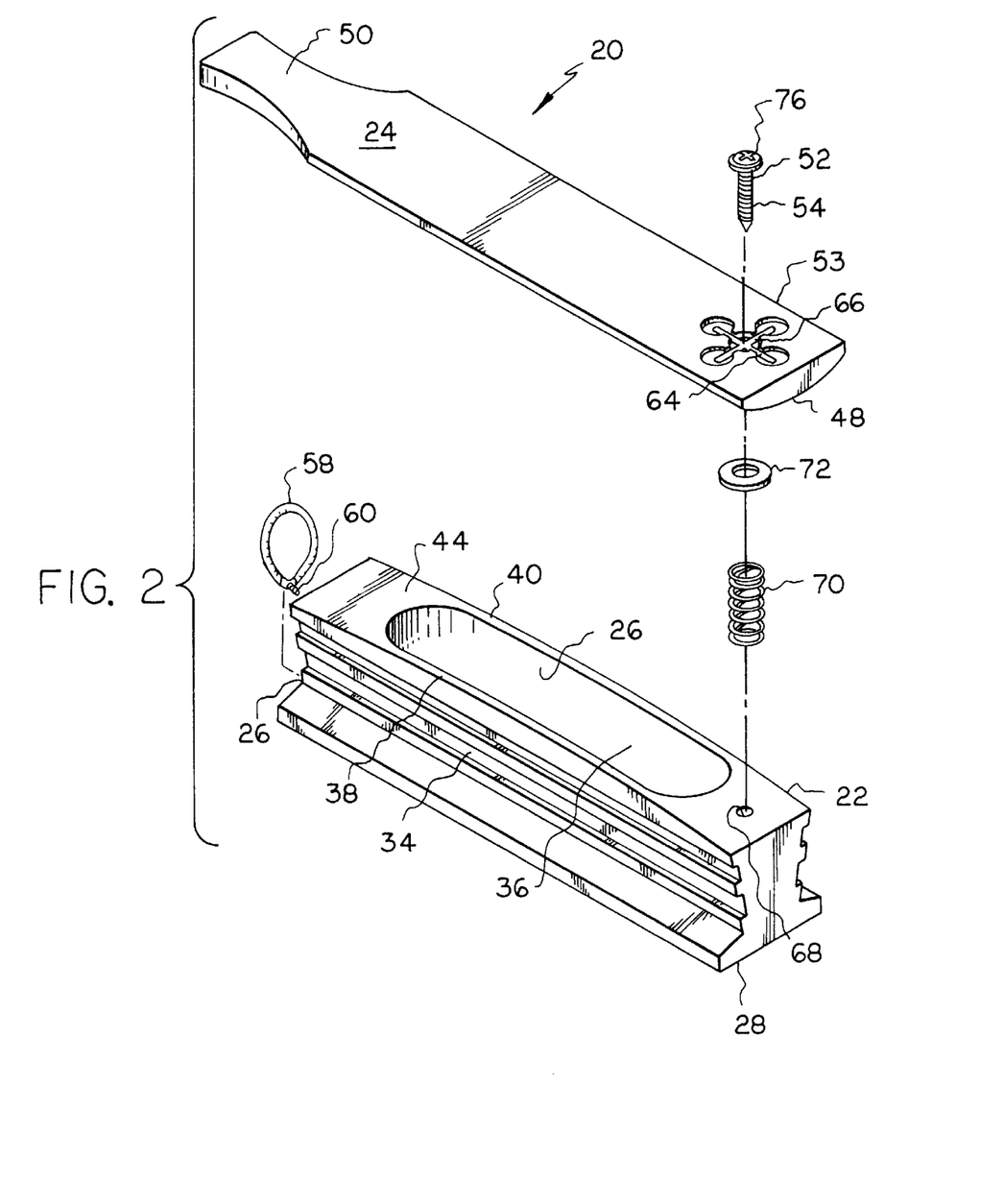
FIG. 2 is an exploded view thereof.

The hand-held call box 22 is formed in the shape of a trough, having a sounding chamber, illustrated at 26 in FIG. 2, centrally in its upper surface 44 and shaped to define a thick bottom wall 28, thick forward and aft end walls 30 and 32 respectively, and thin elongate side walls 34 and 36 terminating in thin upper edges 38 and 40 respectively. The side walls 34 and 36 are reinforced by longitudinal ribs 42 one of which defines the upper edge in each side. The bottom wall 28 has an enlarged width to afford stability when the call is laid down.

Figure 9:
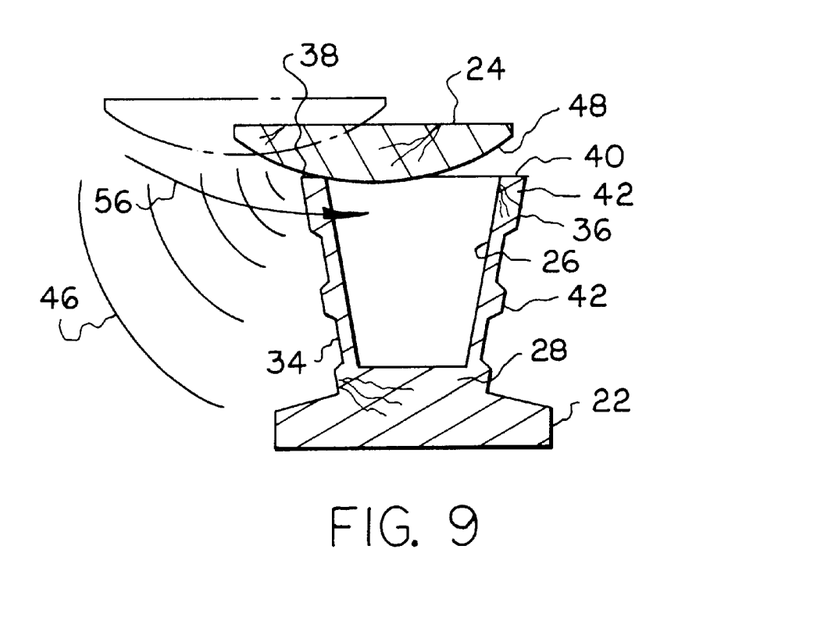
FIGS. 9 and 10 are sectional views taken along lines 9—9 of FIG. 5 illustrating sliding movement over the box edges respectively for making respectively desired sounds.
Figure 10:
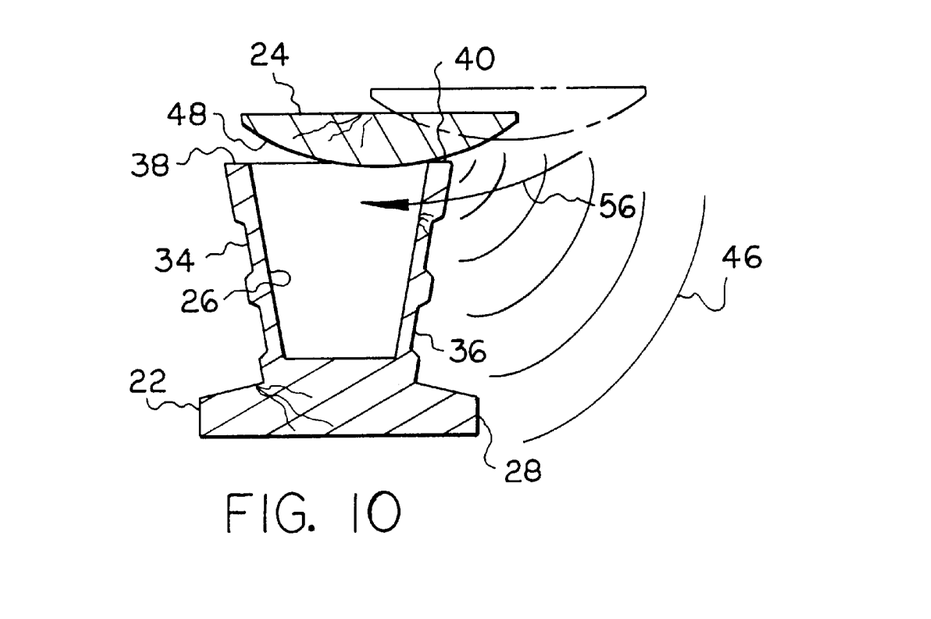

The upper surface 44 of the call box 22, including the edges 38 and 40, is bowed to have a concave arcuate shape so as to thereby present only a small intermediate portion longitudinally of each edge to the paddle 24 for making a sound, illustrated at 46 in FIGS. 9 and 10.

The paddle or striker member 24 is an elongate thin member having a length and width to fit over or overlie the upper surface 44 of the box 22, and its aft end portion 50 extends rearwardly beyond the rear end of the box and has a reduced width which is suitably shaped to define a handle. The paddle upper surface 51 is generally flat.

Figure 5:
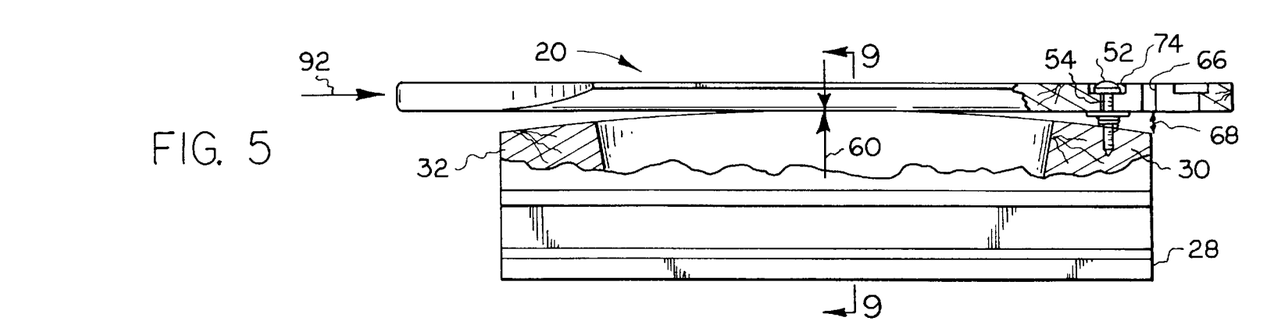
FIGS. 5 and 6 are side views, partially in section, thereof illustrating different positions to which the paddle is adjustable along a longitudinal slot thereof.
Figures 6, 7, 8:
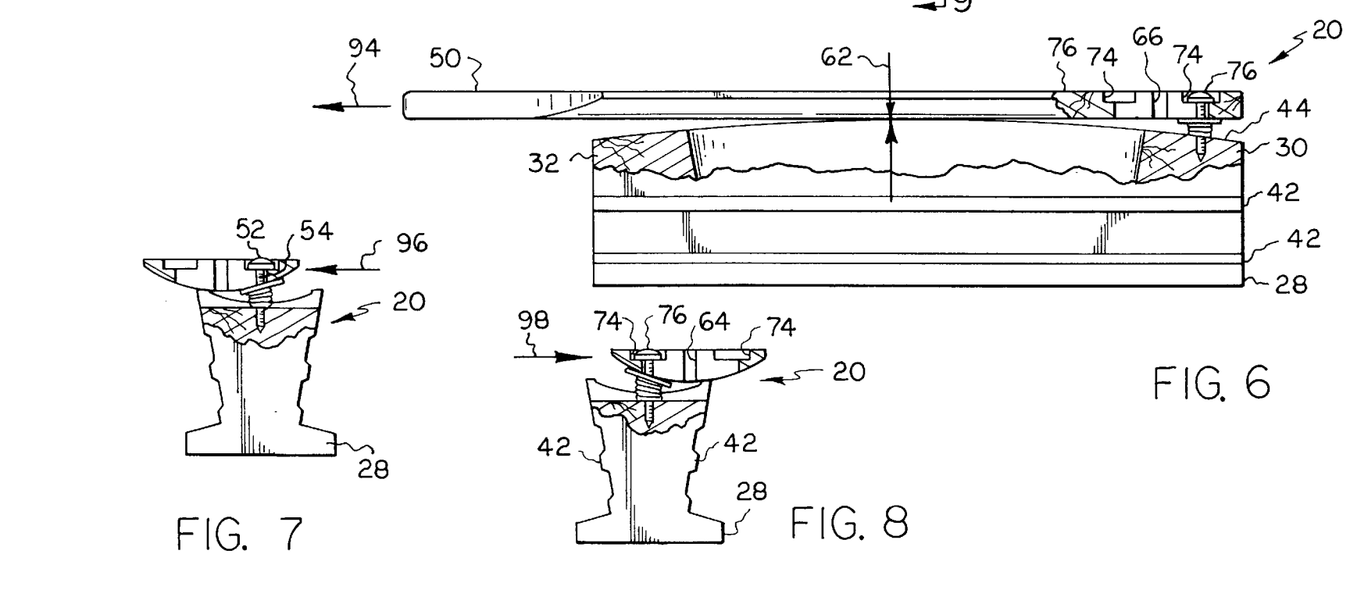
FIGS. 7 and 8 are front end views, partially in section, thereof illustrating different positions to which the paddle is adjustable along a slot thereof which is cross-wise to the longitudinal slot.

The lower surface 48 of the paddle is bowed to have a concave arcuate shape width-wise thereof to thereby present a rounded surface to the edges 38 and 40 for producing a high quality sound, the contact between the paddle 24 and the box edges 38 and 40 being illustrated at 60 and 62 in FIGS. 5 and 6 respectively. A suitable chalk or the like may be applied to the edges 38 and 40 and the paddle surface 48 to improve friction between the rubbing surfaces to aid in the production of high quality sound.

The forward end portion 53 of the paddle 24 is attached to the forward wall 30 of the box 22 by means of a screw 52, as discussed in greater detail hereinafter, to allow the paddle 24 to pivot about the screw shank 54, as illustrated at 56 in FIGS. 9 and 10, for effecting movement of the paddle 24 cross-wise of the edges 38 and 40 for producing the sounds. When the call 20 is not being used, the handle 50 may be suitably secured against such pivotal movement by suitable means such as an elastic band 58 attached to lower part of the aft wall 28 by a screw 60 or other suitable means, wherein the band 58 is sized to stretch tautly over the handle 50.

Due to inherent slight differences arising naturally during construction, the sound made when the paddle 24 slides over one edge 38 will be different from the sound made when the paddle 24 slides over the other edge 40, when the paddle is attached in the same position on the box 22. The edges 38 and 40 may, if desired, be made of different widths to achieve such a difference in sound quality.

The following example as well as other examples provided herein are provided, unless otherwise specified, with respect to a preferred embodiment and are provided for exemplary purposes only and not for purposes of limitation. For example, the box 22 may be about 7½ inches long, about 1¾ inches wide at the bottom, about 1⅜ inches wide at the top surface, have a height which ranges between its ends and intermediate portion of between about 1⅝ and 2 inches, and have a height and length of its trough 26 of about 1⅜ inches and 5¼ inches respectively. The edges may, for example, have a thickness of about 1/16 to 3/32 inch. The paddle 24 may, for example, have a length of about 9½ inches, a width of about 1¾ inches, and a thickness at its longitudinal centerline of about 5/16 inch.

The forward end portion 53 of the paddle 24 has two slots, illustrated at 64 and 66 which cross each other, one 64 extending longitudinally and the other 66 extending crosswise thereto. The slots 64 and 66 are provided for receiving the shank 54 of screw 52 so that can pass through the lower surface of the paddle 24, and the screw shank 54 is threadedly receivable in aperture, illustrated at 68, in the upper surface of the forward wall 30 for attachment of the paddle 24 to the box 22 so that the forward end portion of the paddle 24 is at a suitable height, illustrated at 68, above the forward wall upper surface of the box to allow the paddle lower surface 48 to suitably engage the edges 38 and 40. This height 68 can be varied (adjusted, by tightening or loosening the screw 52) to vary the sound quality and may typically be kept at about 3/16 to ¼ inch. A spring 70 and a washer 72 are received on the screw shank 54 and disposed between the paddle 24 and the box 22, the washer 72 engaging the paddle lower surface, to bias the paddle 24 outwardly from the box 22 to the position for use for making the calling sounds. The slots 64 and 66 are also provided to allow the screw 52 to be moved to different positions along the upper surface of the paddle 24 for adjusting the orientation of the paddle 24 relative to the box edges 38 and 40 to vary the sounds produced as desired.

A circular recess, illustrated at 74, is provided in the upper surface 76 of the paddle 24 in alignment with each end of each slot 64 and 66 (for a total of 4 recesses) and a fifth recess 74 is provided to be in alignment with the intersection of the slots 64 and 66. The recesses 74 are provided, in accordance with the present invention, in order to receive and hold the head 76 of the screw 52 at a selected position so that it does not slide along one of the slots 64 and 66 and thereby cause the paddle 24 to get out of the selected position. The screw head 76 is held in a selected recess 74 by the biasing force of the spring 70. The slots 64 and 66 allow movement of the screw head 76 (by movement of the paddle 24 relative to the screw 52) from one recess 74 to another recess 74 without the necessity of removing the screw 52.

The longitudinal slot 64 is preferably centered between the edges 38 and 40 to make clear sounds of different pitches. The crosswise slot 66 allows the paddle to be off-center to thereby make more raspy sounds. Thus, the call of the present invention is provided with the longitudinal and cross-wise slots 64 and 66 to allow a greater variety of high quality sounds to be made.

Figures 1, 3:
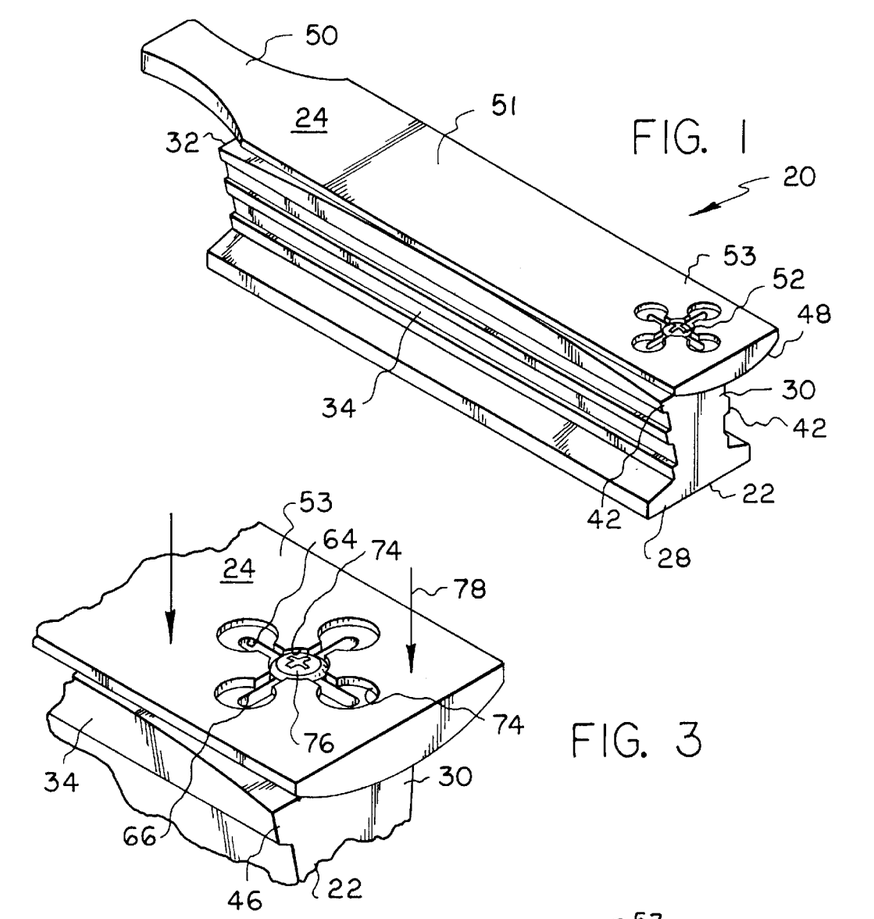
FIG. 1 is a perspective view of a game call which embodies the present invention.
FIGS. 3 and 4 are enlarged front top perspective views thereof illustrating successive steps in adjusting the paddle position thereon.
Figure 4:
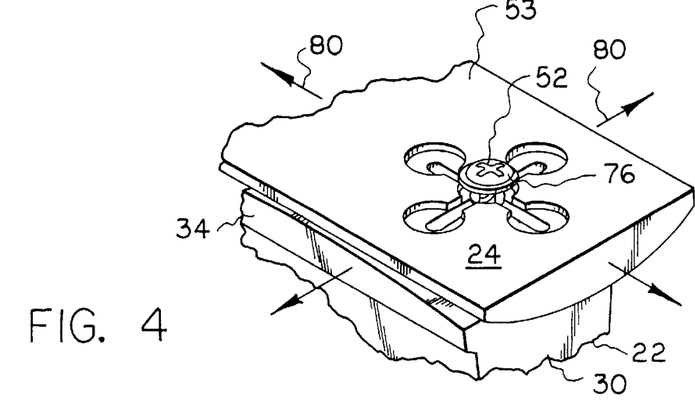

FIG. 3 illustrates the paddle 24 positioned with the screw head 76 in the center recess 74. In order to reposition the paddle 24 with the screw head 76 in another recess 74, the paddle 24 is pushed downwardly, as illustrated at 78, overcoming the bias force of the spring 70, so that the screw head 76 is raised out of the recess 74, as illustrated in FIG. 4. The paddle 24 may then be slid back or forth or toward one side to one of the other recesses 74, as illustrated at 80, then released with the result that the biasing force of the spring 70 will effect engagement of the screw head 76 in the other recess 74. FIGS. 5, 6, 7, and 8 illustrate paddle 24 in four different positions respectively. Thus, as illustrated at 92 in FIG. 5, with the screw head 76 in the central recess, the paddle 24 is pushed forwardly to effect a position wherein the screw head 76 is in the rear recess of the longitudinal slot 64. This allows the paddle 24 to strike an edge at a point 60 more forwardly for producing a higher pitch sound. As illustrated at 94 in FIG. 6, with the screw head 76 in the central recess, the paddle 24 is pulled rearwardly to effect a position wherein the screw head 76 is in the forward recess of the longitudinal slot 64. This allows the paddle 24 to strike an edge at a point 62 more rearwardly for producing a higher pitch sound which may be of a different pitch or quality. When the screw head 76 is in the central recess, the paddle 24 will strike an edge at a point between points 60 and 62 for producing a lower pitch sound. As illustrated at 96 in FIG. 7, with the screw head 76 in the central recess, the paddle 24 is pushed toward one side to effect a position wherein the screw head 76 is in an outer recess of the crosswise slot 66 whereby the paddle is off-center to thereby make a more raspy sound. As illustrated at 98 in FIG. 8, with the screw head 76 in the central recess, the paddle 24 is pushed toward the other side to effect a position wherein the screw head 76 is in the other outer recess of the crosswise slot 66 to thereby be off-center toward the other edge and thereby also make a raspy sound which may however be of a different quality. FIGS. 9 and 10 illustrate at 56 movement of the paddle 24 against one edge 38 in FIG. 9 and the other edge 40 in FIG. 10 to effect the desired sounds 46.

Since each edge 38 and 40 has different characteristics for making different sounds and since the paddle 24 is adjustably movable, easily and quickly and reliably, to five different positions for making different sounds, the call 20 has the capability of reliably making a total of 10 different sounds (both more clear and more raspy and with different pitches), with adjustments which can be made easily and quickly and reliably.

Figure 11:
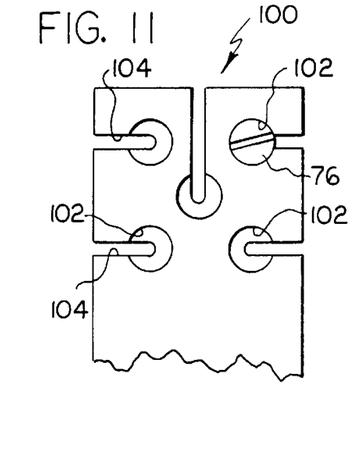
FIG. 11 is a plan view of a forward end portion of a paddle in accordance with an alternative embodiment of the present invention.

It should be appreciated that various variations can be made in the number and positioning of the slots and recesses. For example, there may be only a single slot, more than two slots, more or less than three recesses along the length of a slot, the intersection of slots may not necessarily have a recess, and the slots may be oriented in other directions. Referring to FIG. 11, there is shown generally at 100 the forward end portion of a striker member in accordance with such an alternative embodiment. There is illustrated a plurality of, for example, five recesses 102 for receiving screw head 76. A slot, illustrated at 104, extends from an edge of the striker plate to the center of each recess 102 for receiving the screw shank 54 whereby the screw head 76 may be moved from one to an other of the recesses 102 by moving it (i.e., moving the paddle relative to the screw ) out along the slot 104 for the one recess and then engaging the screw by the slot 104 for the other recess and moving the screw head 76 along this slot to the other recess.

Figure 12:
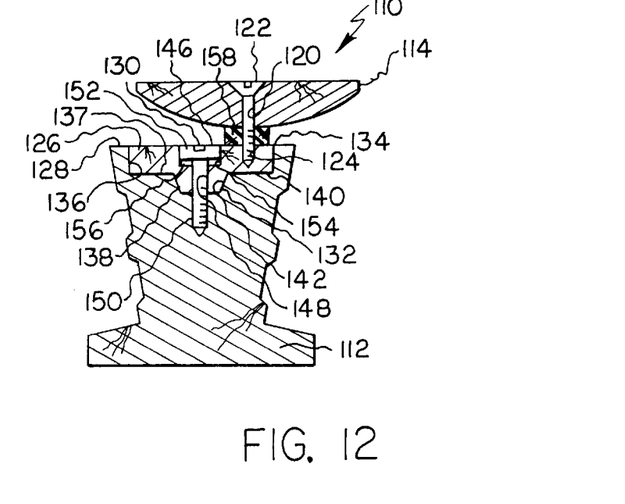
FIG. 12 is a vertical sectional view of a call in accordance with an alternative embodiment of the present invention.
Figures 13, 14:
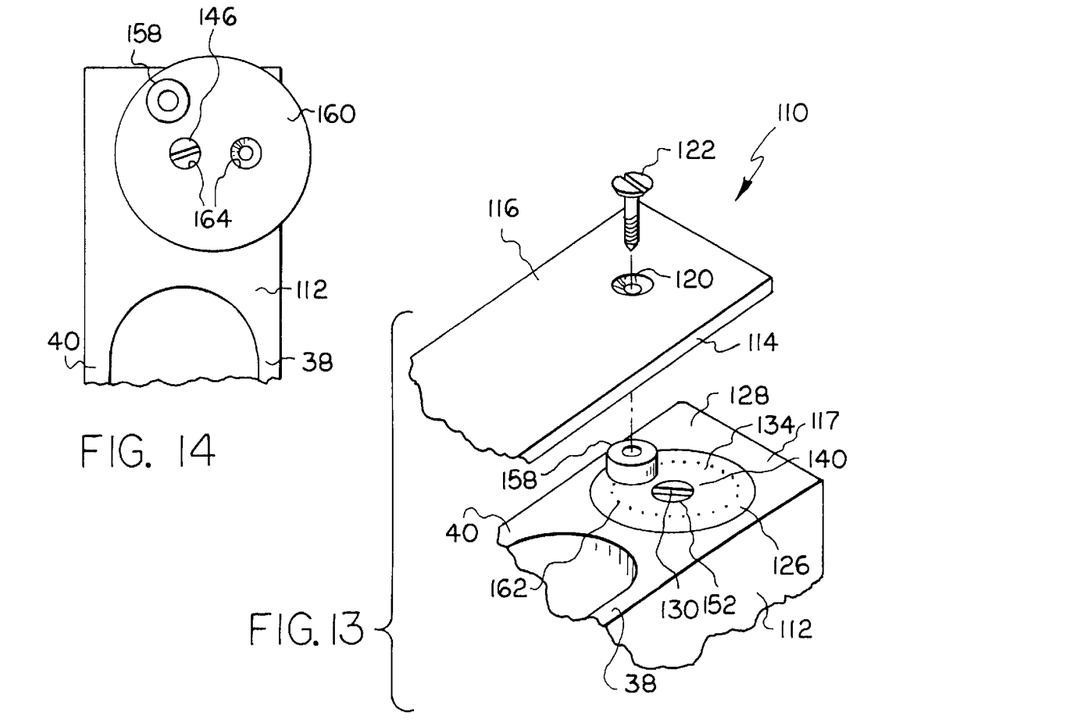
FIG. 13 is partial perspective exploded view of the call of FIG. 12.
FIG. 14 is a partial plan view of an alternative embodiment of the box for the call of FIGS. 12 and 13.

Referring to FIGS. 12 and 13, there is shown generally at 110 a box call in accordance with an alternative embodiment of the present invention. The call 110 includes a box 112 and a striker member 114 which are similar to box 22 and striker member 24 respectively of call 20, except as described hereinafter relative to the means of attachment of the striker member 114 to the box 112. Like the call 20, the forward end portion 116 of the striker member 114 is attached to the forward wall 117 of the box 22.

An aperture, illustrated at 120, is provided in the forward end portion 116 of the striker member 114 (preferably midway between the sides thereof) for receiving a screw 122 or other suitable fastener. The aperture 120 is preferably countersunk to receive the head of screw 122 flush with the upper surface of the striker member 114.

In order to allow the striker member 114 to be adjustable through various orientations, as illustrated by dots 162, relative to the box edges 38 and 40 for producing various sounds as desired, in accordance with the present invention, the screw 122 is threadedly received in an aperture, illustrated at 124, in a disc 126 which is rotatably received in (or on) the upper surface 128 of the forward wall 117 of the box 22 (as hereinafter discussed), and the aperture 124 is offset from the center, illustrated at 130, of the disc 126, i.e., the disc 126 rotates about a center portion 132, and the aperture 124 is contained in a peripheral portion 134 so that it is rotatable about the center portion 132. The screw 122 is preferably of the self-threading type with a blunt end (not pointed) so as to prevent it from impinging on the box 22.

The disc 126 is shown to be rotatably seated in a ring or recess, illustrated at 136, milled in the upper surface 128 of the call box 22 and preferably has a central protrusion or base or knob portion 138 on its lower surface 140 which is rotatably received in a bore, illustrated at 142, in the floor 137 of the recess 136 so as to provide stability to the seating of the disc 126 in the recess 136. By "disc", as used in this specification and the claims, is meant a thin member or member portion, i.e., one whose thickness is substantially smaller than its diameter. The disc 126 (and the base 138, if provided) is preferably composed of a single piece of injected molded plastic material.

The disc 126 is attached to the call box 22 by a screw 146 or other suitable fastener which is received in an aperture, illustrated at 148, in the disc 126 at the center of rotation 130 and is threadedly received in an aperture, illustrated at 150, in the floor of the bore 148. The head 152 of the screw 146 is received in a counter-sunk bore, illustrated at 154, of aperture 148 so as to be flush with the upper surface of the call box and thereby not interfere with movement of the striker member 114.

In order to maintain the disc 126 securely attached to the call box 22 while allowing rotation thereof for adjustment of sound quality, a foam washer 156 or other suitable spring member is disposed in the counter-bore 154 under the head 152 of screw 146. Thus, the spring member 156 is provided to allow the disc 126 to be rotated for adjusting sound quality but only when enough force is applied to overcome the spring force, and the spring member 156 may be suitably selected and sized, in accordance with principles commonly known to those of ordinary skill in the art to which this invention pertains, to apply enough force to prevent inadvertent rotation of the disc 126 yet allow such rotation when a desired minimal force is applied.

A foam washer 158 or other suitable spring member is disposed on the screw 122 between the striker member 114 and the disc 126 to stabilize and allow pivoting movement of the striker member 114 while it is held securely to the call box 22 by the screw 122. The particular characteristics and size of the spring member 158 may be selected using principles commonly known to those of ordinary skill in the art to which the present invention pertains.

It should be understood that the disc 126 may be provided in various other shapes and sizes. Referring to FIG. 14, there is illustrated at 160 an alternative embodiment of the disc. Since the disc 160 is a thin member (with or without a small diameter protruding portion) which is contained in or on the upper surface of the call box, it may be so large in diameter as to overhang sides of-the box, as illustrated in FIG. 14, without compromising the structural integrity thereof. The increased diameter disc 160 is provided to allow a better range of sound adjustment positions 162.

As also illustrated in FIG. 14, the disc 160 may, if desired, have more than one aperture, illustrated at 164, in its center portion for receiving screw 146 thereby providing two different groups of sound positions 162 for a greater number of sound options.

It should be understood that, while the present invention has been described in detail herein, the invention can be embodied otherwise without departing from the principles thereof. Such other embodiments are meant to come within the scope of the present invention as defined by the appended claims.

What is claimed is:

1. A game call comprising an elongate box including a bottom wall, a forward end wall, an aft end wall, and a pair of side walls extending from said bottom wall and each having an upper terminal edge, an elongate member for overlying and striking said terminal edges for making a sound of game and having an aft end portion for use as a handle, a forward end portion, an upper surface, and a lower surface, and means for pivotally attaching said forward end portion of said striking member to said forward end wall of said box, said attaching means comprising a fastener having a shank portion for engaging said forward end wall of said box and having a head portion, means defining a plurality of recesses in said upper surface of said striking member for receiving said head portion, and means for enabling movement of said head portion from one of said recess means to an other of said recess means without removing said fastener.

2. A call according to claim 1 wherein said movement enabling means comprises slot means extending to each of said recess means for receiving said shank portion for enabling movement thereof within said slot means to and from each of said recess means.

3. A call according to claim 1 wherein said movement enabling means comprises at least one means defining a slot extending between said recess means for receiving said shank portion for enabling movement thereof within said slot means from one of said recess means to an other of said recess means.

4. A call according to claim 2 wherein said slot means comprises a slot extending from each of said recess means to an edge of said striking member.

5. A call according to claim 1 wherein said movement enabling means comprises means defining at least two crossing slots extending between and interconnecting said recess means for receiving said shank portion for enabling movement thereof within said slot means from one of said recess means to an other of said recess means.

6. A call according to claim 1 wherein at least one of said recess means is spaced laterally of said striking member from at least one other of said recess means.

7. A call according to claim 1 further comprising means for spring biasing said fastener head portion in said recess means.

8. A game call comprising an elongate box including a bottom wall, a forward end wall, an aft end wall, and a pair of side walls extending from said bottom wall and each having an upper terminal edge, an elongate member for overlying and striking said terminal edges for making a sound of game and having an aft end portion for use as a handle, a forward end portion, an upper surface, and a lower surface, and means for pivotally attaching said forward end portion of said striking member to said forward end wall of said box, said attaching means comprising a fastener, means defining a plurality of crossing slots in said striking member for receiving said fastener such that said fastener is movable to various positions along said slot means, and aperture means in said forward end wall for receiving said fastener.

9. A call according to claim 8 wherein said fastener has a head portion, the call further comprising means defining a plurality of recesses in said upper surface of said striking member and along said slot means for receiving said head portion.

10. A call according to claim 9 further comprising means for spring biasing said fastener head portion in said recess means.

11. A game call comprising an elongate box including a bottom wall, a forward end wall, an aft end wall, and a pair of side walls extending from said bottom wall and each having an upper terminal edge, an elongate member for overlying and striking said terminal edges for making a sound of game and having an aft end portion for use as a handle, a forward end portion, an upper surface, and a lower surface, and means for pivotally attaching said forward end portion of said striking member to said forward end wall of said box, said attaching means comprising a fastener, aperture means in said forward end portion for receiving said fastener, a disc having a center portion and a peripheral portion, means defining a recess in said forward end wall and having a floor for receiving said disc, means for attaching said disc to said floor so that said disc is rotatable, and means for attaching said fastener to said peripheral portion.

12. A call according to claim 11 further comprising spring means disposed on said fastener between said striking member and said disc.

13. A came call comprising an elongate box including a bottom wall, a forward end wall, an aft end wall, and a pair of side walls extending from said bottom wall and each having an upper terminal edge, an elongate member for overlying and striking said terminal edges for making a sound of game and having an aft end portion for use as a handle, a forward end portion, an upper surface, and a lower surface, and means for pivotally attaching said forward end portion of said striking member to said forward end wall of said box, said attaching means comprising a fastener, aperture means in said forward end portion for receiving said fastener, a disc having a center portion and a peripheral portion, means comprising a second fastener having a head portion and a shank portion for attaching said disc to said forward end wall so that said disc is rotatable, means for attaching said fastener to said peripheral portion, and spring means disposed on said second fastener between said head and said disc.

14. A call according to claim 13 further comprising spring means disposed on said striking member attaching means fastener between said striking member and said disc.

15. A call according to claim 11 wherein said disc includes means defining a protruding portion on a lower surface thereof for stabilizing rotation of said disc.

16. A game call comprising an elongate box including a bottom wall, a forward end wall, an aft end wall, and a pair of side walls extending from said bottom wall and each having an upper terminal edge, an elongate member for overlying and striking said terminal edges for making a sound of game and having an aft end portion for use as a handle, a forward end portion, an upper surface, and a lower surface, and means for pivotally attaching said forward end portion of said striking member to said forward end wall of said box, said attaching means comprising a fastener, aperture means in said forward end portion for receiving said fastener, a disc having a center portion and a peripheral portion, means for attaching said disc to said forward end wall so that said disc is rotatable, and means for attaching said fastener to said peripheral portion, wherein said disc attaching means comprises a second fastener and means defining at least two apertures in said disc for alternately receiving said second fastener.

17. A call according to claim 13 further comprising spring means disposed on said fastener between said striking member and said disc.

18. A call according to claim 13 wherein said disc attaching means comprises means defining a recess in said forward end wall and having a floor for receiving said disc.

19. A call according to claim 16 further comprising spring means disposed on said striking member attaching means fastener between said striking member and said disc.

20. A call according to claim 16 wherein said disc attaching means comprises means defining a recess in said forward end wall and having a floor for receiving said disc.

* * * * *